United States Patent Office 3,605,131
Patented Sept. 20, 1971

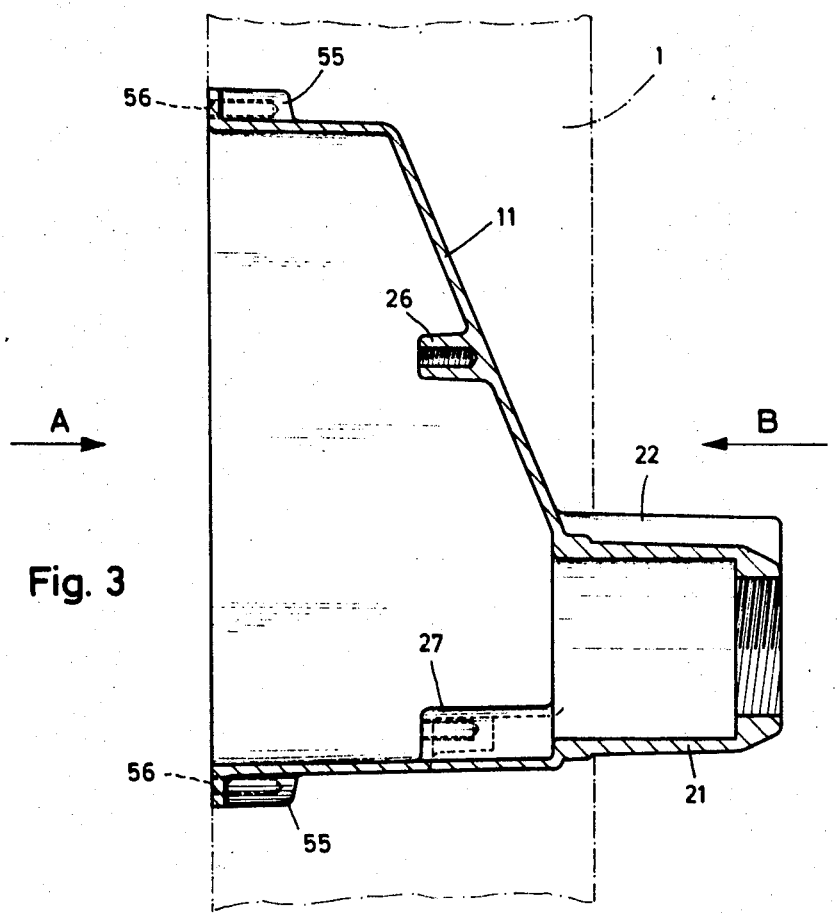
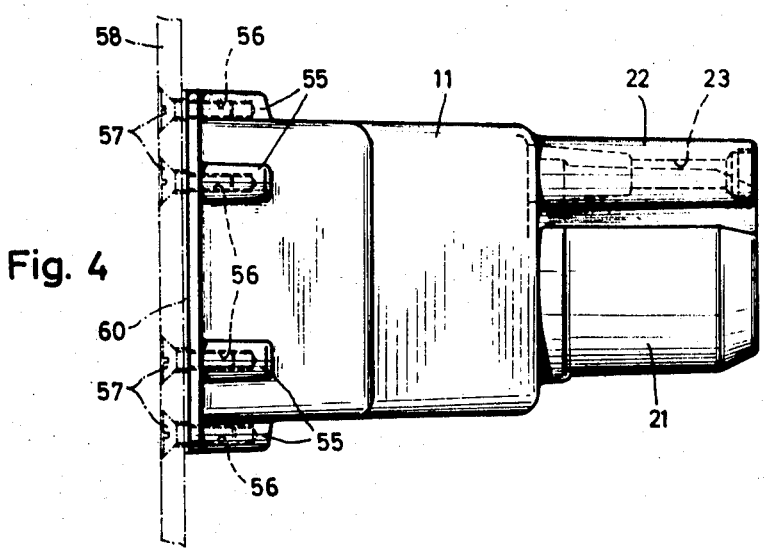

3,605,131
DEVICE FOR GENERATING A CURRENT OF WATER IN SWIMMING POOLS
Rudolf Brazel and Ernst Ritz, Schwabisch Gmund, and Elmar Weller, Lindach, Germany, assignors to UWE-Unterwasser-Electric GmbH & Co. KG., Schwabisch Gmund, Germany
Filed July 29, 1969, Ser. No. 845,818
Int. Cl. E04h 3/18, 3/20
U.S. Cl. 4—172.16                12 Claims

ABSTRACT OF THE DISCLOSURE

A housing is mounted in a shell secured in the wall of a swimming pool and has a swingable nozzle for connection with a source of water under pressure to provide a water jet in the pool which can be turned on or off by a handle on the housing and may permit the introduction of admixed air into the jet stream.

---

The invention concerns a device for generating a current of water in swimming pools, in which a water jet issues from at least one nozzle located below the surface of the water and connected with the pressure nipple of a motor driven pump.

It is known (German Design Pat. 1,964,441), how to provide in the swimming pool wall a nozzle directed into the swimming pool water for the purpose of generating a water current in the swimming pool, the said nozzle being connected with the pressure nipple of a pump disposed outside the pool, whereby the suction nipple of the pump is connected with an outlet opening of the swimming pool. In the known devices the disadvantage exists, that the watertight attachment of the nozzle can be accomplished only with difficulty and in addition the installed nozzle can not be adjusted in its position.

The invention addresses itself to the task of overcoming these defects and to propose a device of the kind mentioned by way of introduction, whereby the nozzle together with the necessary mechanical and electrical installations can be attached in a simple way so as to be watertight, and adjustably arranged in the swimming pool wall.

The problem is solved according to the invention in that the nozzle is disposed on a nozzle housing and this housing is held adjustably in a shell that is permanently attached to the swimming pool wall.

In a preferred embodiment of the invention it is provided that the nozzle housing is movable at right angles to the swimming pool wall and rotatable around an axis at right angles to the pool wall, whereby the nozzle housing can extend into a neck, which through the interposition of a seal is forced slidably and rotatably into a pipe connector of the shell.

On the nozzle housing there is advantageously disposed a switch for actuating an electric motor carrying the pump as well as a valve regulating the flow of water to the nozzle.

According to a further preferred configuration of the invention it is provided that the nozzle is pivotably mounted in the nozzle housing by means of a ball joint and that a ball head of the nozzle is pressed by means of a spring with the interposition of a cup ring against a bar that is swingably attached to the front of the nozzle housing.

The fronts of the nozzle housing and shell are preferably covered by a plate.

In another preferred embodiment of the invention two nozzles are disposed one above the other in the nozzle housing, and the flow of water can be switched between the nozzles by means of a valve.

In a further advantageous development of the invention it is provided, that for the purpose of an admixture of air to the nozzle jet there is disposed in the interior of the nozzle one end of a pipe, whose other end opens into the atmosphere, whereby the end of the pipe opening into the atmosphere can be closed by means of a closing device.

The following description of preferred embodiments of devices according to the invention in combination with the attached drawing serves for further explanation. The figures show the following:

FIG. 3 is a sectional view of the shell along line 3—3 in FIG. 5;

FIG. 4 is a top view of the shell;

Figure 1:
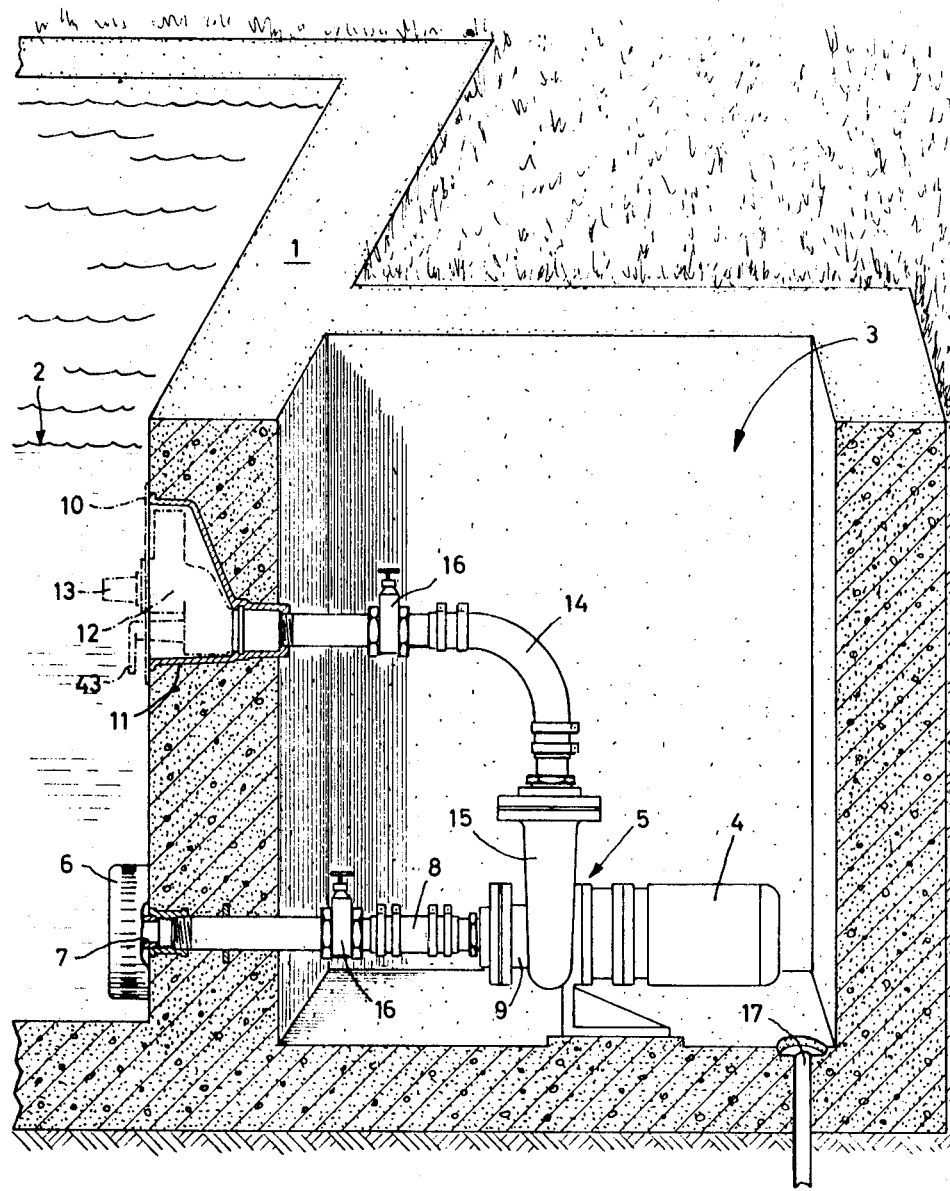
FIG. 1 is a partial view in section of a swimming pool with the basic configuration and arrangement of a device according to the invention.

As is seen from FIG. 1, behind a wall 1 of a swimming pool, whose water surface is indicated by 2, a special compartment 3 is provided, which accommodates a water pump 5 of any desired kind, driven by a motor 4. The motor 4 is preferably an electric motor. In the swimming pool wall 1 near the bottom of the pool there is provided an outlet opening 7 covered by a filter 6, which outlet is connected via a pipe 8 with the suction nipple 9 of a pump 5. Above the filter 6 and below the surface of the water 2 a shell 11 is embedded in the swimming pool wall 1, for example embedded in concrete, which shell on the one hand accommodates a housing 12 having a watertight nozzle 13 which is connected via a pipe 14 with the pressure nipple 15 of the pump 5. The cavity of the shell 11 accommodating the nozzle housing 12 is closed by a cover plate 10 having a suitable opening through which the nozzle 13 projects. In pipes 8 and 14 shutoff valves 16 can be inserted. The compartment 3 can also have an outlet 17, for the drainage of any rain water that might enter.

In operation of the device, pump 5 draws water from the swimming pool through the opening 7 and carries it via pipe 14 to the nozzle housing 12, where it issues from the nozzle 13 in the form of a powerful jet directed into the swimming pool and generates a water current in the pool. The jet issuing from the nozzle 13 can also be used for massage purposes by persons staying near the nozzle.

As will be explained in detail in the following, the device according to the invention has the advantage that only the shell 11 needs to be permanently mounted in or on the swimming pool wall 1, which can be done without difficulties and with the assurance of a complete seal. After completion of the actual construction work on the swimming pool, the nozzle housing 12, carrying the nozzle 13, can be inserted, in a watertight manner, into the pre-installed shell 11—and can be adjusted as required. This will be explained in detail in the following with reference to preferred embodiments of the invention.

Figure 2:
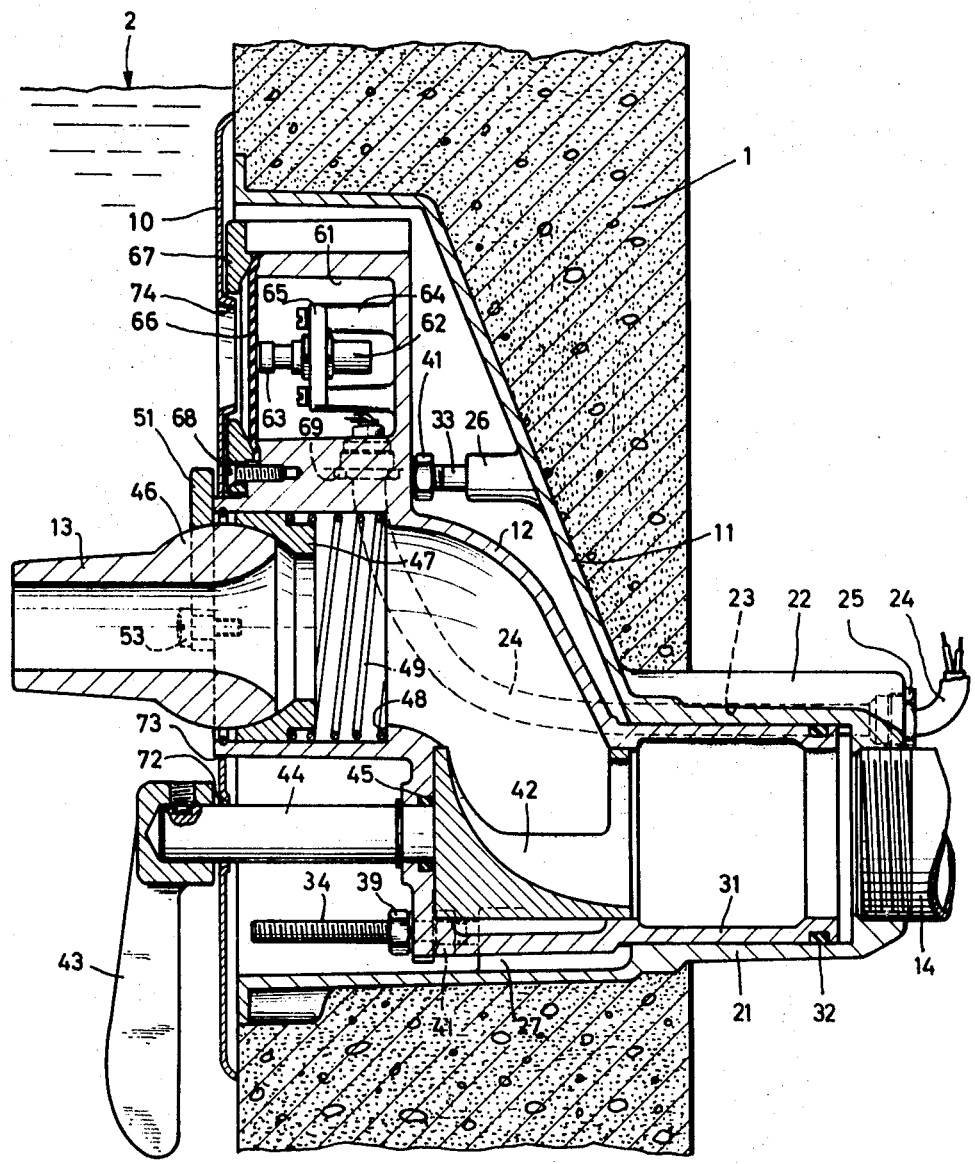
FIG. 2 is a sectional view on an enlarged scale of the device according to the invention shown in FIG. 1.
Figures 5, 6:
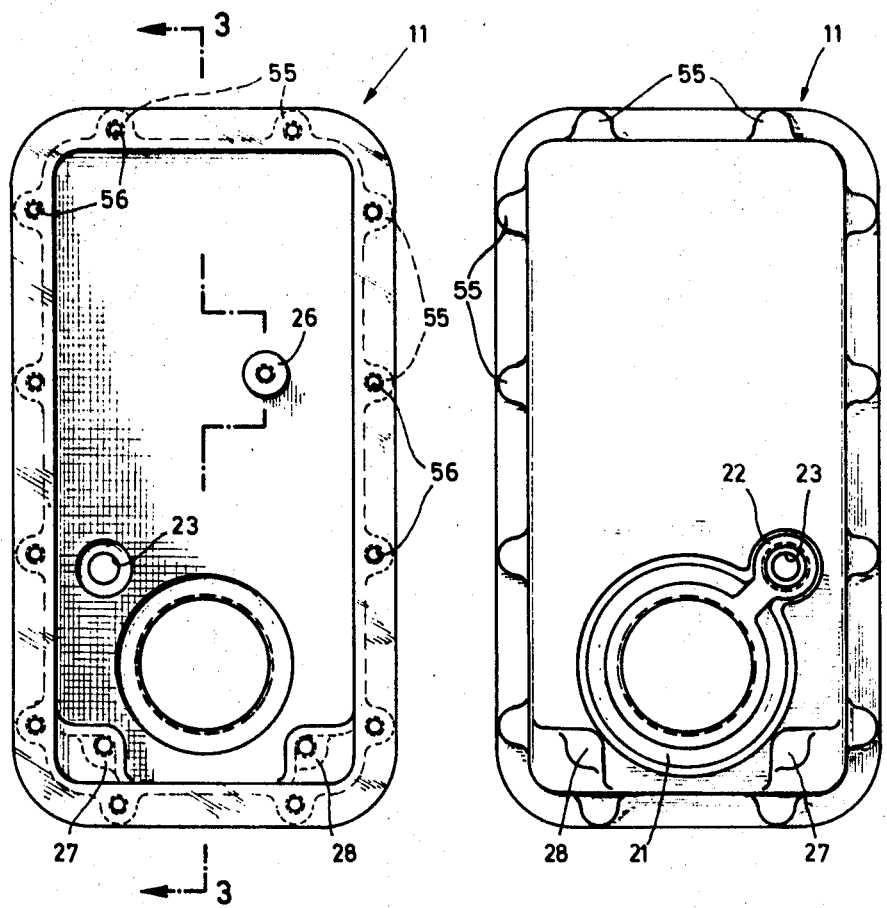
FIG. 5 is a front view of the shell in the direction of arrow A in FIG. 3.
FIG. 6 is a rear view of the shell in the direction of arrow B in FIG. 3.

FIG. 2 represents an enlarged sectional view of an embodiment of a device according to the invention. The shell 11 is embedded watertight in the concrete of the swimming pool wall 1 and extends into a pipe connector 21 into which is screwed the pipe 14 leading to the pump 5. The shell 11 which is preferably manufactured of cast metal has a cast-on portion 22 (FIGS. 3 and 4) provided with a bore 23. A cable 24 can be introduced watertight into the interior of the shell 11 through the bore 23 by means of a screw coupling 25. The shell 11 also has three inwardly directed cast-on portions 26, 27, and 28 with threaded bores, which serve for the attachment of the nozzle housing 12 (FIGS. 2–6).

In the embodiment of the invention represented in FIGS. 1 and 2, the shell 11 is embedded in a concrete swimming pool wall. The shell 11 can however, in other embodiments of the invention, be attached to such swimming pool walls that for example consist of relatively thin plastic or sheetmetal. For this purpose, as can be seen from FIGS. 3 to 6, the edge of the shell 11 is provided with cast-on portions 55, provided with internally threaded bores 56. In FIG. 4 it is shown how, with the aid of these cast-on portions 55, the shell 11 with the interposition of a seal 60 may be attached by means of screws 57 to the back of a relatively thin swimming pool wall 58, for example of plastic.

Figures 7, 8:
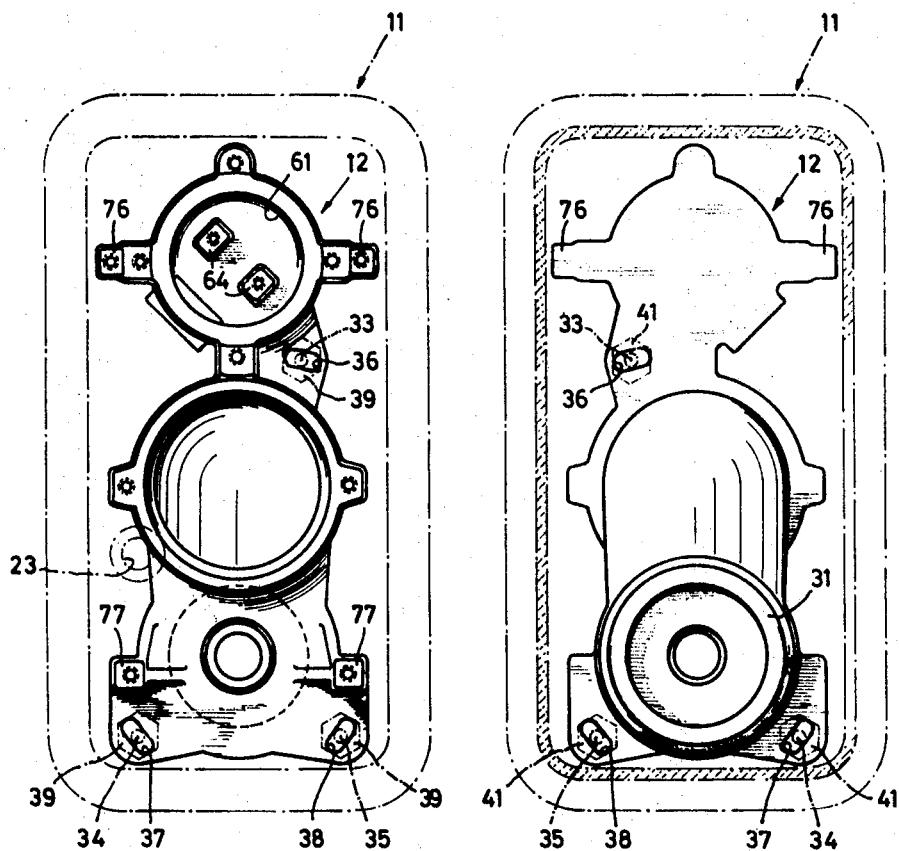
FIG. 7 is a front view of a nozzle housing.
FIG. 8 is a rear view of a nozzle housing.

The nozzle housing 12, which is shown in front and rear view in FIGS. 7 and 8 respectively, extends according to FIG. 2 into a cylindrical neck 31, which with the interposition of a seal 32 is introduced into the pipe connector 21 of the shell 11 with a snug fit. In this way the nozzle housing 12 can be introduced deeply enough into the shell 11 and still be twisted by a small angular amount, so that deviations that may occur in the installation of the shell 11 in the swimming pool wall 1 can be compensated for. The fixing of the nozzle housing 12 in the adjusted position is effected by means of three screw bolts 33, 34, 35 (of which bolt 35 is invisible in FIG. 2). As seen in FIGS. 7 and 8, curved slots 36, 37 and 38 are provided for the entry of bolts 33 to 35 into the nozzle housing 12, which slots permit a subsequent twisting by a small angular amount of the nozzle housing after it has been introduced into the pipe connector 21. The attachment of the nozzle housing 12 with the bolts 33 to 35 is effected in the manner illustrated by means of nuts and counter nuts and the interposition of washers or lock washers. In FIG. 2 only one nut is indicated by the reference number 39 and the matching counter nut by 41.

As is seen best in FIG. 2, the interior of the neck 31 which is connected with the pipe 14 is connected with the nozzle 13 via a rotary slide valve 42, so that when the rotary slide valve 42 is open the water coming from the pressure connection of the pump 5 can flow via pipe 14 through the nozzle housing to the nozzle 13. The rotary slide valve 42 is equipped with a detachable handle 43 which makes adjustment of the valve possible and thereby a continuous control of the force of the water jet issuing from the nozzle 13. Handle 43 is connected by a shaft 44 with the rotary slide valve 42, this shaft being rotatably supported in the nozzle housing 12 with the interposition of a seal 45.

The nozzle 13 has a ball-shaped head 46 by means of which it is rotatably mounted in a matching cup ring 47. The cup ring 47 in turn is fitted in with a sliding fit in a corresponding bore in the nozzle housing 12 and is pressed against the ball head 46 of the nozzle 13 by a compression spring 49 that abuts against a shoulder 48 of the nozzle housing. The nozzle 13 which thereby is tensioned toward the front bears with the front part of the ball-shaped head 46 against a curved bar 51, which is swingably supported by means of a screw 52 at the front part of the nozzle housing. The shape of the bar 51 and its support is seen (in connection with another embodiment of the invention) in FIG. 11. The semicircular bar 51 has at its free end a slot, with which it engages the rear of the head of screw 53 and in this way is fastened. To insert the nozzle 13 the bar 51 is swung away upwardly from the screw 53.

The ball-shaped head 46 of the nozzle may then be inserted into the cup ring 47 and pressed together with the cup ring 47 inwardly against the force of the spring 49, so that the bar 51 again can be swung back and fastened under the head of the screw 53. When the nozzle 13 is released the spring 49 with the cup ring 47 will press the nozzle head against the bar 51. In this way a swiveling mounting of the nozzle 13 with simultaneous sealing is insured.

In the nozzle housing 12 there is also provided above the nozzle 13 a further space 61 (according to FIGS. 2, 7 and 8), which serves to accommodate a switch 62 for controlling the electric motor 4 that drives the pump 5. The switch 62, which is provided with a push button 63, is supported by a bridge 65 mounted on the brackets 64. The space 61 is covered by an elastic waterproof membrane 66 which is held in place by a ring 67 and screws 68. The membrane 66, made for example of rubber or plastic, seals off space 61, so that the switch 62, can be placed below the surface 2 of the water and operated from the swimming pool. Switch 62 is (in a manner not shown) connected with the cable 24, which is introduced into space 61 by means of a watertight screw coupling 69 (FIG. 2).

Figure 9:
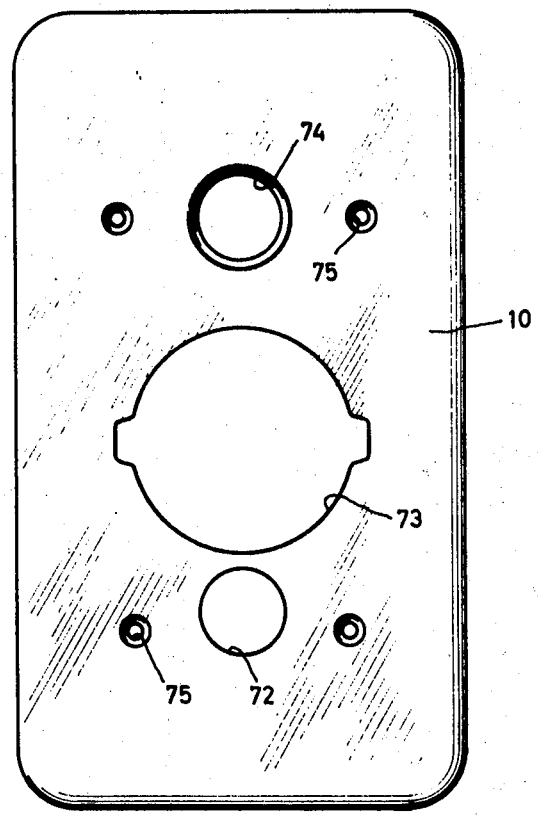
FIG. 9 is a view of a cover plate.

As is furthermore evident from FIG. 2, the nozzle housing 12 which is equipped with handle 43, nozzle 13 and membrane 66 and disposed in the shell 11, is covered by a cover plate 10 which has openings 72, 73 and 74 for the entry of the shaft 44 of the handle 43, the nozzle 13 and the membrane 66 (FIG. 9). The cover plate 10 is attached by means of screws that engage threaded bores through holes 75 in the cover plate, which bores are provided in corresponding cast-on portions 76 and 77 of the nozzle housing as shown in FIGS. 7 and 8.

Figure 10:
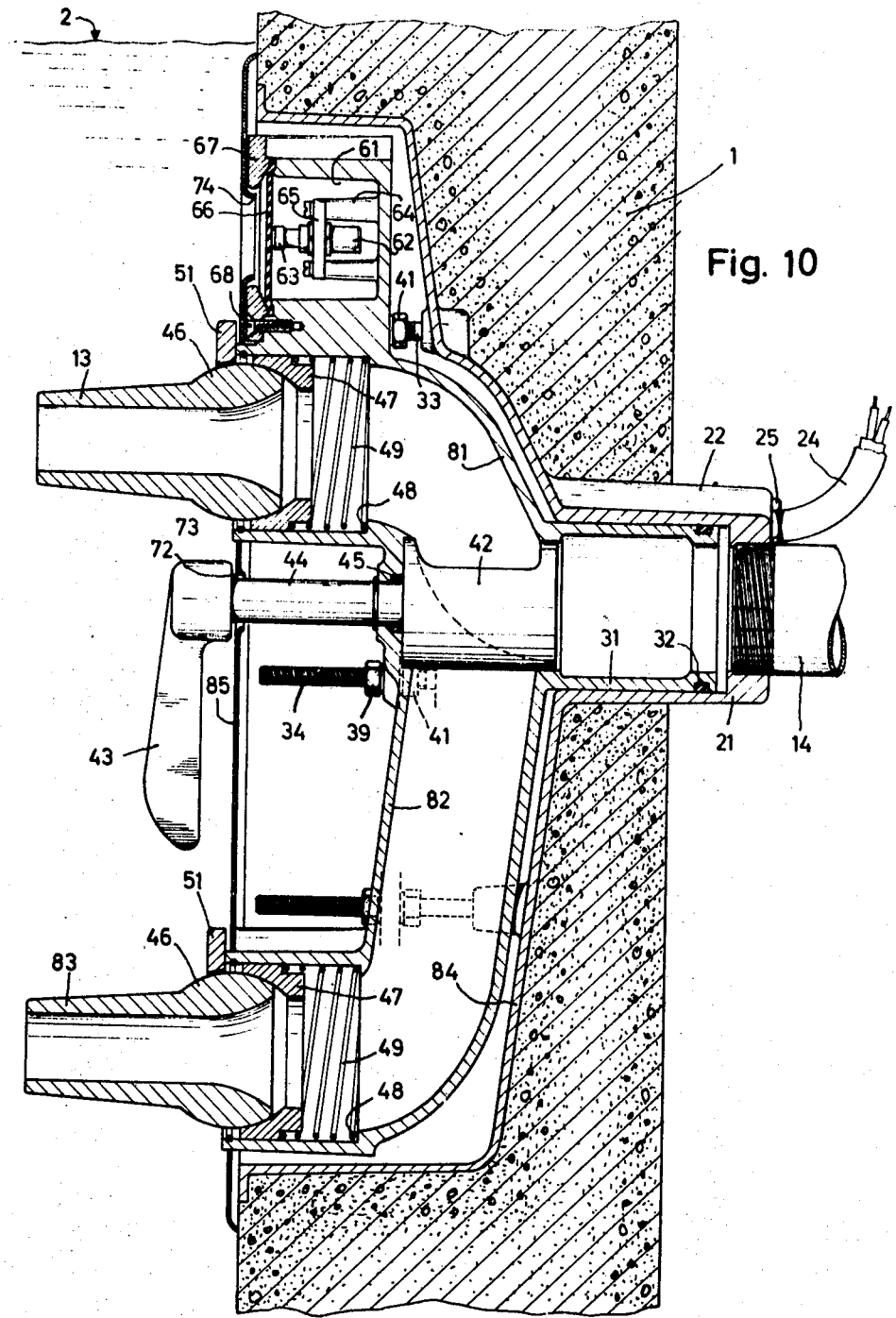
FIG. 10 is a modified embodiment of the device according to the invention with two nozzles.
Figure 11:
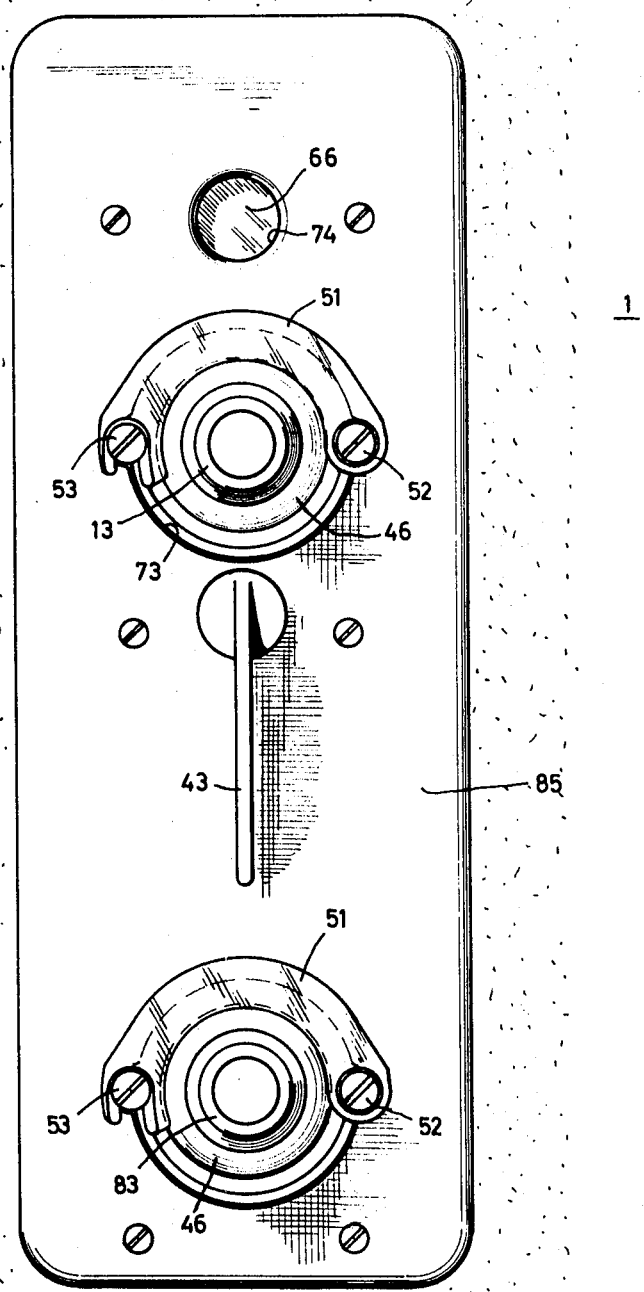
FIG. 11 is a front view of the device of FIG. 10.

In FIGS. 10 and 11, in which the same reference numbers designate corresponding parts to those in FIGS. 1 to 9, a modified form of the invention is represented, which differs from the embodiment described above essentially in that a nozzle housing 81 has a downwardly directed branch 82, which carries a second nozzle 83 located below the upper nozzle 13. According to the position of the slide valve 42, the water current supplied by the pump to the pipe 14 is conducted to nozzle 13 or to nozzle 83. The nozzle housing 81 is contained in a correspondingly larger shell 84. Nozzle housing and shell are covered by a cover plate 85, which has openings for both nozzles 13 and 83, the handle 43 and the membrane 66 of the switch 62. Otherwise the embodiment according to FIGS. 10 and 11 corresponds in design, attachment and mode of operation to that of FIGS. 1 to 9. The embodiment according to FIGS. 10 and 11 has the advantage that the current of water can be switched at will from one nozzle to the other. Thereby the depth of the water current can be regulated so that the upper nozzle 13 is used for massaging the upper parts and extremities of the body while the lower nozzle 83 is used for massaging the lower parts and extremities of the body.

Figure 12:
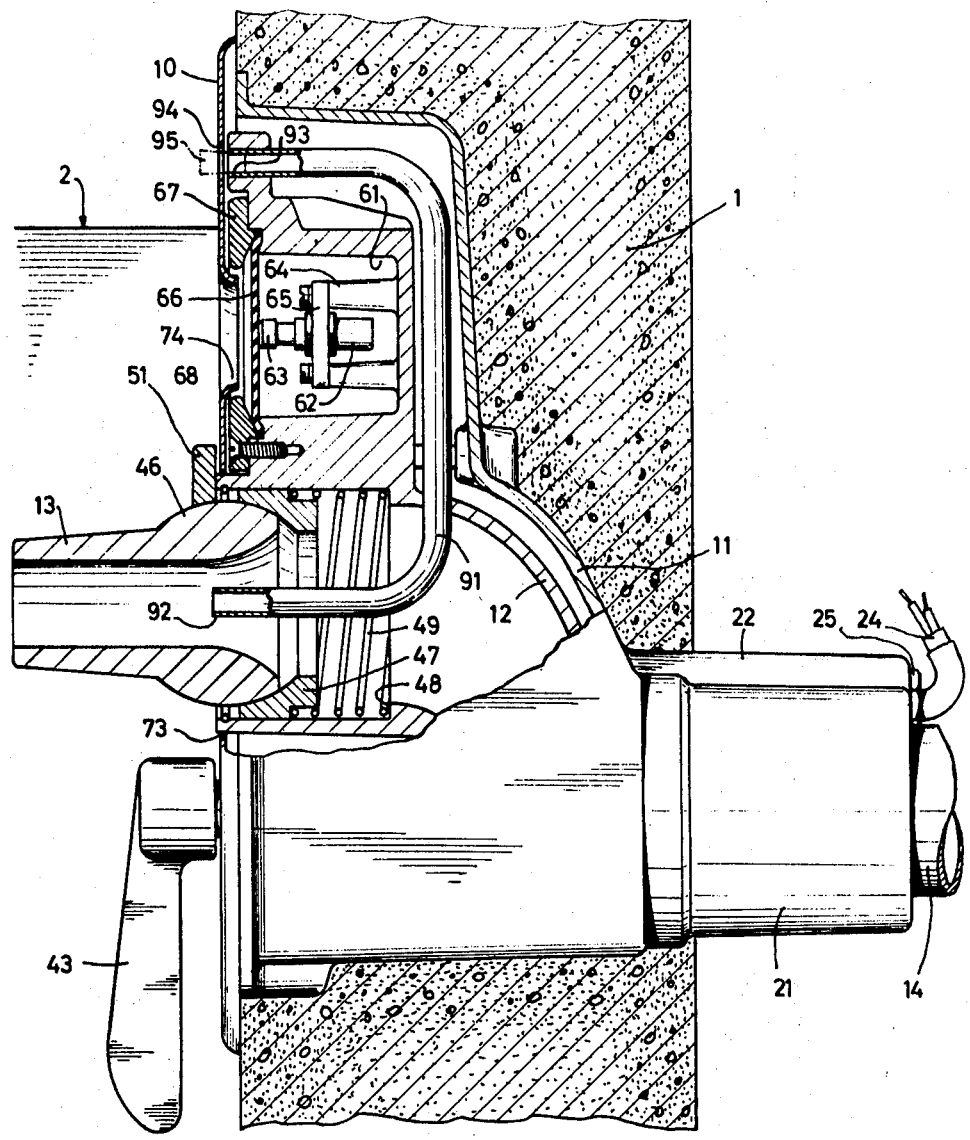
FIG. 12 is a sectional view of another embodiment of the invention.

Finally, FIG. 12 shows a third embodiment of the invention, in which again the same reference numbers designate corresponding parts to those in FIGS. 1 to 11. In this embodiment an air admixing pipe 91 is provided between nozzle housing 12 and shell 11, having a U-shape as seen in the figure. One end 92 of the pipe 91 is disposed in the center of the opening of nozzle 13, and at a point where the cross section of the nozzle opening narrows. The other end 93 of pipe 91 is conveyed to a point located above the water surface 2 in the free atmosphere and lies immediately behind a hole 94 in the cover plate 10.

The end 93 of the pipe opening into the atmosphere can be closed by a closing device 95. The closing device can for example simply be a stopper. Of course, a manually operated valve or the like can also be provided as a closing device.

The air admixing pipe 91 operates in a manner such that when a jet of water issues from nozzle 13 air is sucked in through opening 93 and is mixed with the water jet as it issues from opening 92. This air admixture takes place according to the operating principle of a water jet pump. In this way an air bubble bath can be obtained. The finely divided air admixture also has the effect of making the water jet feel softer. If a jet without air or with a low air admixture is desired, the air supply at the pipe end 93 can be choked or cut off by a suitably designed closing device.

We claim:

1. An apparatus for generating a current of water in a swimming pool, the combination including a shell to be fixedly mounted on a side wall of a pool below the water line thereof, said shell being open at one end and having a connector portion for connection with a source of water under pressure, a housing received within said shell, said housing including inlet means for adjustable connection with said connector portion of the shell, the housing also including outlet means for directing a jet of water into a pool and control means for regulating the direction and flow of water through said outlet means, and cooperating means on said housing and shell for positioning the housing for adjustable slidable movement in the shell along an axis perpendicular to the wall of the pool.

2. The invention defined in claim 1, wherein said housing and shell include cooperating means for mounting the housing for adjustable rotatable movement in the shell about an axis perpendicular to the wall of a pool.

3. The invention defined in claim 2, wherein said housing is provided with a projecting cylindrical inlet neck portion slidably and rotatably received in a bore provided in said shell for connection with said source of water.

4. The invention defined in claim 1, wherein said control means includes electric switch means.

5. The invention defined in claim 4, wherein said electric switch means includes actuating means, said actuating means including an elastic membrane arranged at the front of said housing.

6. The invention defined in claim 1, wherein said control means includes a passage in said housing connecting said inlet means with said outlet means, and rotatable slide valve means in said passage for regulating the flow of water to the outlet means.

7. The invention defined in claim 1, wherein said outlet means includes nozzle means having a ball-shaped portion for connection with said housing.

8. The invention defined in claim 7, wherein said outlet means includes a bore provided in said housing, a cup-shaped element axially slidably received in said last named bore for engagement with said ball-shaped portion, spring means in said bore urging said cup-shaped member into said engagement, and a bar swingably mounted on the housing for removable engagement with said ball-shaped element to hold said element for swiveling movement in said bore.

9. The invention defined in claim 1, wherein the open end of said shell is closed by a removable cover provided with suitable openings for said outlet means and control means of said housing contained within said shell.

10. The invention defined in claim 1, wherein said outlet means includes two vertically spaced nozzle means for directing separate jet streams of water into a pool, and passage means connecting said two nozzle means with said inlet means, said control means including valve means in said passage means for selectively directing water from the inlet means to said two nozzle means.

11. The invention defined in claim 1, wherein said outlet means includes nozzle means for directing a jet stream of water into a pool and air admixing means, said last named means including a pipe having one end in communication with the interior of said nozzle means, the other end of said pipe being in communication with the atmosphere.

12. The invention defined in claim 11, wherein said air admixing means includes throttling means for said other end of the pipe for regulating the admission of air into said jet stream of water.

References Cited

UNITED STATES PATENTS

| 1,855,258 | 4/1932 | Sirch | 4—172.17 |
| 2,073,784 | 3/1937 | Day | 4—172.17X |
| 2,088,410 | 7/1937 | Everson | 4—172.17X |
| 3,045,829 | 7/1962 | Rule et al. | 4—172.17UX |
| 3,247,968 | 4/1966 | Miller | 4—172.17UX |

HENRY K. ARTIS, Primary Examiner